Dec. 8, 1942.  H. F. BUSH  2,304,535
DIRECT CURRENT MEASURING INSTRUMENT
Filed Sept. 17, 1941
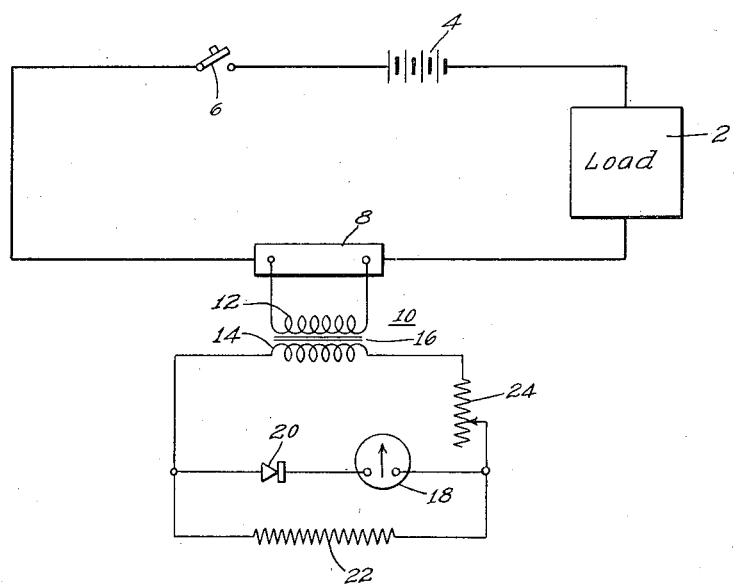
WITNESSES:
INVENTOR
Howard F. Bush.
BY
ATTORNEY

Patented Dec. 8, 1942

2,304,535

UNITED STATES PATENT OFFICE

2,304,535

DIRECT CURRENT MEASURING INSTRUMENT

Howard F. Bush, South Orange, N. J., assignor to Westinghouse Electric & Manufacturing Company, East Pittsburgh, Pa., a corporation of Pennsylvania Application September 17, 1941, Serial No. 411,117

3 Claims. (Cl. 171—95)

The present invention relates to a direct current measuring instrument and has particular relation to such an instrument for measuring the current which flows in a circuit which is closed only momentarily.

In many cases it becomes desirable to so measure the magnitude of the current flow in a direct current circuit which may be closed for only a short indefinite time. In magnetic testing, for example, the material undergoing test may be subjected to a relatively high direct current to magnetize it. The magnetization may be completed in as short a time as one-tenth second and it is especially undesirable to maintain the circuit closed any longer than necessary when the current is supplied from storage batteries as is generally the case. Since the natural indicating period of a ballistic instrument may be from a second to one and one-half seconds in order to produce a reading which may be readily observed, such instruments will not give uniform or accurate indications with a circuit of this type. When an instrument is connected in such a circuit, either directly or through a shunt, it will receive not only an impulse due to the instantaneous rise of current from zero to its normal value but will continue to receive current so long as the circuit remains closed. Even where the ballistic instrument is connected for energization through a transformer the reading is dependent upon the time of closure since the transformer will transmit the negative impulse resulting from re-opening of the circuit as well as the initial impulse caused by its closure.

The present invention provides an arrangement for obtaining an accurate and uniform indication of the magnitude of the current in this type of circuit irrespective of the length of time during which it is closed. This is accomplished by providing a half wave rectifier in the secondary winding circuit of a transformer supplying a ballistic instrument. The instrument and rectifier are thus arranged so that only the initial output impulse resulting from the closing of the circuit passes through the instrument. Consequently the instrument is in no way affected by the impulse resulting from the re-opening of the circuit and the reading is thus independent of the length of time during which the circuit is closed.

It is accordingly an object of the invention to provide a novel and improved direct current measuring instrument.

Another object of the invention is to provide a device which gives a uniform and accurate indication of the current in a direct current circuit irrespective of the period of time for which the circuit is closed.

A further object of the invention is to provide a device wherein a ballistic type instrument is energized by only one of a pair of opposite impulses produced in the secondary winding of a transformer as a result of opening and closing of a direct current circuit energizing the primary winding.

Other objects and advantages of the invention will appear from the following detailed description read in conjunction with the accompanying drawing in which the single figure is a schematic diagram of a preferred embodiment of the invention.

In the drawing a load device 2, which may be a piece of material to be magnetized, is connected in series circuit with a direct current supply such as a storage battery 4. A switch 6, which may be either manually or automatically operated, is disposed in the circuit to control the energization of the load 2 as well as a resistance shunt 8 which is connected in series therewith.

A transformer designated as 10 is shown as including a primary winding 12, a secondary winding 14 and an iron core 16. The primary winding 12 is connected across the terminals of the shunt device 8 to energize the transformer in accordance with the current flowing in the direct current circuit while the secondary winding 14 is connected to energize an instrument 18 which may, for example, be a ballistic galvanometer of either the D'Arsonval or moving magnet type. A half wave rectifier 20, which is preferably of the copper oxide contact type, is connected in series with the instrument 18 to permit current from the secondary winding 14 to flow therethrough in only the direction corresponding to a rise of current in the load circuit. A resistor 22 is connected in shunt across the series connected instrument and rectifier to provide a path for current flowing in the opposite direction from that which passes through the rectifier 20.

An adjustable resistance designated as 24 is preferably disposed in series with the secondary transformer winding 14 to calibrate the device in a manner which will be evident from the following description.

It will appear that no current will flow in the direct current circuit while the switch 6 is in the open position shown in the drawing. Immediately upon closing of this switch, however, a current flows energizing the load 2 and, in addition, the transformer primary winding 12 through the shunt 8. The impulse flowing in this primary winding as a result of the rapid increase of the current from zero to its normal value will result in a voltage being induced in the secondary winding 14 in such direction as to induce a current to flow through the rectifier 20 and instrument 18. The total amount of current flowing through the instrument and consequently the indication of the instrument will be directly proportional to the amount of current flowing in the direct current circuit when it is closed. Upon the switch being opened, however, the voltage in the secondary winding 14 will be in the opposite direction to that just described and the negative resistance half wave rectifier 20 will prevent its flow through the instrument. As previously mentioned, however, the resistor 22 will provide a path for this current which will consequently fail to affect the measurement.

It will thus be seen that the indication of the instrument 18 will be wholly unaffected by re-opening of the circuit even though it may occur after a very short time within its natural indicating period. Were it not for the rectifier 20, however, a rapid re-opening of the switch 6 within the natural period of the instrument 18 would cause a reverse or negative impulse to traverse the instrument and cause different readings for the same load current where the periods of closure of the circuit varied.

Since the amount of current flowing through the secondary winding of the transformer as a result of a particular voltage being induced therein is determined by the impedance of this circuit, the device may be calibrated readily by adjusting the value of the adjustable resistance 24.

Because of the very short period of time for which the device is carrying current it is possible to use relatively small and inexpensive elements in the measuring circuit. In an embodiment of the invention adapted to measure currents up to 3,000 amperes in the main circuit for periods of time ranging from one-tenth second to several seconds, applicant has found it possible to operate a fifty millivolt shunt at approximately 500% overload without any damage being done thereto. It will thus be seen that the device is relatively inexpensive and may be made into a very compact unit.

Since various modifications of the particular structure shown and described will appear to those skilled in the art it is intended that the invention shall be limited only by the spirit and scope of the appended claims.

I claim as my invention:

1. In combination with a circuit including a load device and a direct current supply for energizing it, a switch for controlling the continuity of said circuit, a transformer including primary and secondary windings, means connecting said primary winding for energization in accordance with the current in said circuit, a ballistic galvanometer, a half wave rectifier, means connecting said galvanometer for energization from said secondary winding through said rectifier in response to an impulse of current resulting in a first direction therein in response to actuation of said controlling switch in a predetermined direction, and means for shunting about said galvanometer current impulses in the opposite direction in said secondary winding.

2. In combination with a circuit including a load device and a direct current supply for energizing it, a normally open switch in said circuit for controlling its continuity, a transformer including primary and secondary windings, means connecting said primary winding for energization in accordance with the current in said circuit a ballistic galvanometer, a half wave rectifier, means connecting said galvanometer for energization from said secondary winding through said rectifier with a single current impulse proportional to the magnitude of the current in said circuit upon its being closed by said controlling switch, and a circuit for conducting current resulting in said secondary winding from the re-opening of said switch in shunt about said galvanometer and rectifier.

3. In combination with a circuit including a load device and a direct current supply for energizing it, a normally open switch in said circuit for controlling its continuity, a transformer including primary and secondary windings, a shunt device in said circuit, means connecting said primary winding to said shunt device for energization in proportion to the current in said circuit, a ballistic galvanometer, a half wave rectifier, means connecting said galvanometer and said rectifier in series circuit across said secondary winding for energizing the galvanometer with a single current impulse proportional to the magnitude of the current in said circuit upon its being closed by said controlling switch, a resistance circuit for conducting current resulting in said secondary winding from the re-opening of said switch in shunt about said galvanometer and said rectifier, and an adjustable resistor disposed in said connecting means to permit adjustment of the proportionality between the current in said circuit and the impulse through said galvanometer.

HOWARD F. BUSH.